US011021042B2

(12) United States Patent
Saito

(10) Patent No.: US 11,021,042 B2
(45) Date of Patent: Jun. 1, 2021

(54) AIR-CONDITIONING CONTROL SYSTEM AND CONTROL METHOD FOR AIR-CONDITIONING CONTROL APPARATUS

(71) Applicant: TOYOTA JIDOSHA KABUSHIKI KAISHA, Toyota (JP)

(72) Inventor: Kan Saito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 16/298,174

(22) Filed: Mar. 11, 2019

(65) Prior Publication Data

US 2019/0344637 A1 Nov. 14, 2019

(30) Foreign Application Priority Data

May 8, 2018 (JP) .............................. JP2018-089878

(51) Int. Cl.
*B60H 1/00* (2006.01)

(52) U.S. Cl.
CPC ..... *B60H 1/00657* (2013.01); *B60H 1/00771* (2013.01)

(58) Field of Classification Search
None
See application file for complete search history.

(56) References Cited

U.S. PATENT DOCUMENTS

| 2008/0066477 | A1* | 3/2008 | Aoki | B60H 1/00785 62/150 |
| 2014/0002277 | A1* | 1/2014 | Fulger | G01C 21/3691 340/905 |
| 2017/0368906 | A1 | 12/2017 | Inui et al. | |
| 2018/0342118 | A1* | 11/2018 | Suzuki | B60H 3/02 |

FOREIGN PATENT DOCUMENTS

| JP | 2002-013799 A | | 1/2002 |
| JP | 2004-322880 A | | 11/2004 |
| JP | 2008126765 A | * | 6/2008 |
| JP | 2013139968 A | * | 7/2013 |
| JP | 2014-020650 A | | 2/2014 |
| JP | 2017-226397 A | | 12/2017 |

* cited by examiner

Primary Examiner — Kelly D Williams
(74) Attorney, Agent, or Firm — Oliff PLC

(57) ABSTRACT

An air-conditioning control system includes: a weather information providing system and an air-conditioning control apparatus that controls an air conditioner installed in a vehicle. The air-conditioning control apparatus includes: a receiving unit that receives, from the weather information providing system, first weather information indicating an estimated weather condition predicted at the vehicle; a measurement unit that performs measurements concerning second weather information indicating an actual weather condition at the position of the vehicle; a judgment unit that judges whether or not a reliability level of the first weather information is below a first threshold value by comparing the first weather information and the second weather information or by detecting a change per unit time of the second weather information; and a transmission unit that transmits, to the weather information providing system.

7 Claims, 4 Drawing Sheets

AIR-CONDITIONING CONTROL SYSTEM AND CONTROL METHOD FOR AIR-CONDITIONING CONTROL APPARATUS

CROSS-REFERENCES TO RELATED APPLICATIONS

This application relates to and claims priority from Japanese Patent Application No. 2018-089878, filed on May 5, 2018, the entire disclosure of which is incorporated herein by reference.

BACKGROUND

Field

The present invention relates to an air conditioning control system and a control method for an air-conditioning control apparatus.

Description of Related Art

A weather prediction system provides real-time weather information (e.g., temperature, atmospheric pressure, humidity, precipitation, etc.) which is predicted based on, for example, observation data of movements of clouds which are observed at observation points provided in several areas of the country. JP2017-226397 A discloses an air-conditioning control system that acquires weather information for a current position of a vehicle from a weather prediction system and controls an in-vehicle air conditioner based on the acquired weather information. The weather prediction system may divide the country into meshes of a certain area and treat weather information from a particular point (such as an observation point on a flatland which is suitable for weather observation) in each mesh as weather information representing a weather condition inside the relevant mesh. The size of each mesh may be, for example, a square of several kilometers or several hundred kilometers.

However, weather conditions in some positions in a certain mesh may be different from the weather condition at the above-mentioned particular point. For example, as in a situation where a vehicle travels from a flatland to a mountain, a weather condition at a current position of the vehicle may greatly vary from the weather condition at the particular point in the mesh.

If the actual weather condition at the current position of the vehicle varies from the weather condition indicated by the weather information provided by the weather prediction system, the air-conditioning control system in JP2017-226397 A is not capable of appropriately controlling the in-vehicle air conditioner. For example, in a situation where the humidity indicated by the weather information provided by the weather prediction system is low even though the actual humidity at the current position of the vehicle is high, the air-conditioning control system disclosed in JP2017-226397 A automatically performs air conditioning so as to circulate inside air. Such air conditioning is not desirable as it causes the windows of the vehicle to fog up despite the driver's intentions.

SUMMARY

An object of the invention is to provide an air-conditioning control system capable of solving the above-mentioned problem and appropriately controlling an air conditioner in a vehicle.

In order to solve the above-mentioned problem, an air-conditioning control system according to an aspect of the invention includes: a weather information providing system that provides weather information; and an air-conditioning control apparatus that controls an air conditioner installed in a vehicle. The air-conditioning control apparatus includes: a receiving unit that receives, from the weather information providing system, first weather information indicating an estimated weather condition at a position of the vehicle; a measurement unit that performs measurements concerning second weather information indicating an actual weather condition at the position of the vehicle; a judgment unit that judges whether or not a reliability level of the first weather information is below a first threshold value by comparing the first weather information and the second weather information or by detecting a change per unit time of the second weather information; and a transmission unit that transmits, to the weather information providing system, positional information of the vehicle as of a time when a measurement concerning the second weather information is performed during a situation where the reliability level of the first weather information is below the first threshold value.

DETAILED DESCRIPTION

Figure 1:
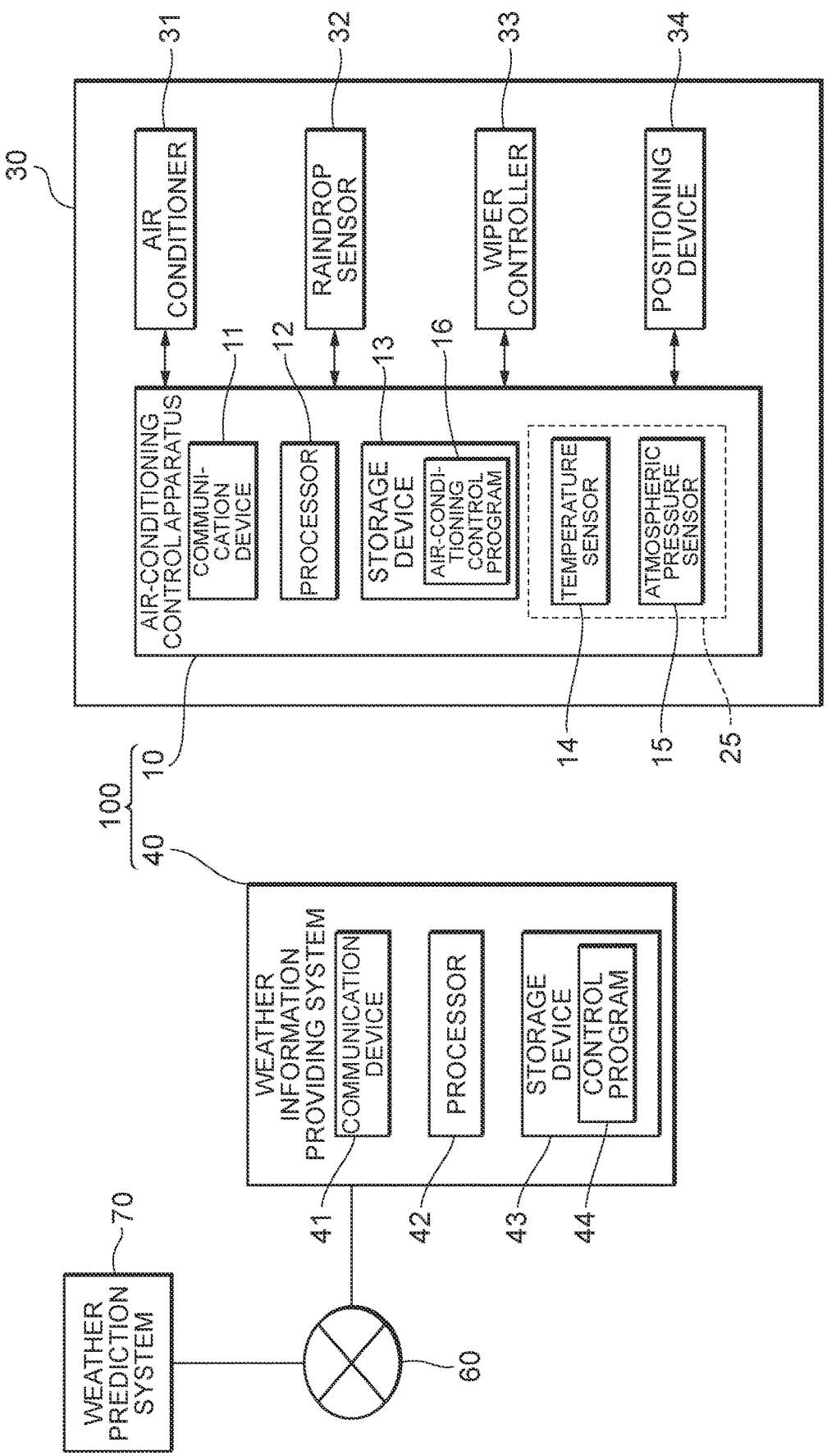
FIG. 1 is an illustration showing a hardware configuration of an air-conditioning control system according to an embodiment of the invention.

Embodiments of the present invention will now be described below with reference to the attached drawings, in which like reference numerals denote like components and redundant descriptions will be omitted.

FIG. 1 is an illustration showing an example of a hardware configuration of an air-conditioning control system 100 according to an embodiment of the invention. The air-conditioning control system 100 includes: a weather information providing system 40 that provides weather information; and an air-conditioning control apparatus 10 that controls an air conditioner 31 installed in a vehicle 30. The weather information providing system 40 is connected to a weather prediction system 70 via a communication network 60. The weather prediction system 70 may be a computer system for providing a weather prediction service provided by, for example, the Japan Meteorological Agency or a private weather predicting company, and such weather prediction system 70 may divide the country into, for example, meshes of a certain area, and provide weather information at a particular point (such as an observation point on a flatland which is suitable for weather observation) in each mesh as weather information representing a weather condition inside the relevant mesh. The weather prediction system 70 updates the weather information at constant time intervals. The weather information providing system 40 may receive, in response to a request from, for example, the air-conditioning control apparatus 10 in the vehicle 30, weather information indicating an estimated weather condition at a current position of the vehicle 30 from the weather prediction system 70 and transmit the received weather information to the air-conditioning control apparatus 10.

The air-conditioning control apparatus 10 controls the air conditioner 31 based on the weather information indicating the estimated weather condition at the current position of the vehicle 30. The air-conditioning control apparatus 10 is a computer system (e.g., an electronic control unit) including hardware resources such as a communication device 11, a processor 12, a storage device 13, a temperature sensor 14, an atmospheric pressure sensor 15. The communication device 11 is a wireless communication module for communicating with the weather information providing system 40 via wireless communication. The storage device 13 is a storage resource provided by a computer-readable storage medium (e.g., a volatile memory, a nonvolatile memory, an optical disc medium and a magnetic disc medium). The storage device 13 stores an air-conditioning control program 16 for controlling the air conditioner 31. A control of the air conditioner 31 by the air-conditioning control apparatus 10 is fulfilled through execution of the air-conditioning control program 16 by the processor 12. The control of the air conditioner 31 by the air-conditioning control apparatus 10 will be described later in more detail.

The temperature sensor 14 detects an actual temperature at the current position of the vehicle 30. The atmospheric pressure sensor 15 detects an actual atmospheric pressure at the current position of the vehicle 30. Although the temperature sensor 14 and the atmospheric pressure sensor 15 may be dedicated sensors for controlling the air conditioner 31, they do not necessarily have to be dedicated sensors for controlling the air conditioner 31. For example, the atmospheric pressure sensor 15 may be a sensor provided for controlling an engine. The temperature sensor 14 and the atmospheric pressure sensor 15 function as a measurement unit 25 for performing measurements concerning weather information indicating the actual weather condition (the actual temperature and atmospheric pressure) at the current position of the vehicle 30. This embodiment describes an example in which the air-conditioning control apparatus 10 does not include a humidity sensor for detecting a humidity inside the vehicle 30.

The air conditioner 31 performs air-conditioning controls for the inside of the vehicle 30 (e.g., controls of an air-conditioning temperature, an air volume, switching between indoor air circulation and outdoor air intake, activation of a defroster, etc.). A raindrop sensor 32 detects raindrops adhering to the vehicle 30 and outputs a raindrop detection signal to the air-conditioning control apparatus 10. A wiper controller 33 outputs a signal indicating the operation status of a wiper of the vehicle 30 (a signal indicating whether the wiper is in operation or in a standby state) to the air-conditioning control apparatus 10. The raindrop detection signal and the signal indicating the operation status of the wiper are used for controlling the air conditioner 31 by the air-conditioning control apparatus 10 (which will be described later in more detail). A positioning device 34 determines the current position of the vehicle 30 and outputs the position information to the air-conditioning control apparatus 10. The positioning device 34 may be, for example, a GPS (Global Positioning System).

The weather information providing system 40 is a computer system (e.g., a host computer) intended for cloud computing, which includes hardware resources such as a communication device 41, a processor 42 and a storage device 43. The storage device 43 is a storage resource provided by a computer-readable storage medium (e.g., a volatile memory, a nonvolatile memory, an optical disc medium and a magnetic disc medium). The storage device 43 stores a control program 44 for assisting the control of the air conditioner 31 by the air-conditioning control apparatus 10. The functions of the weather information providing system 40 are fulfilled through execution of the control program 44 by the processor 42.

Figure 2:
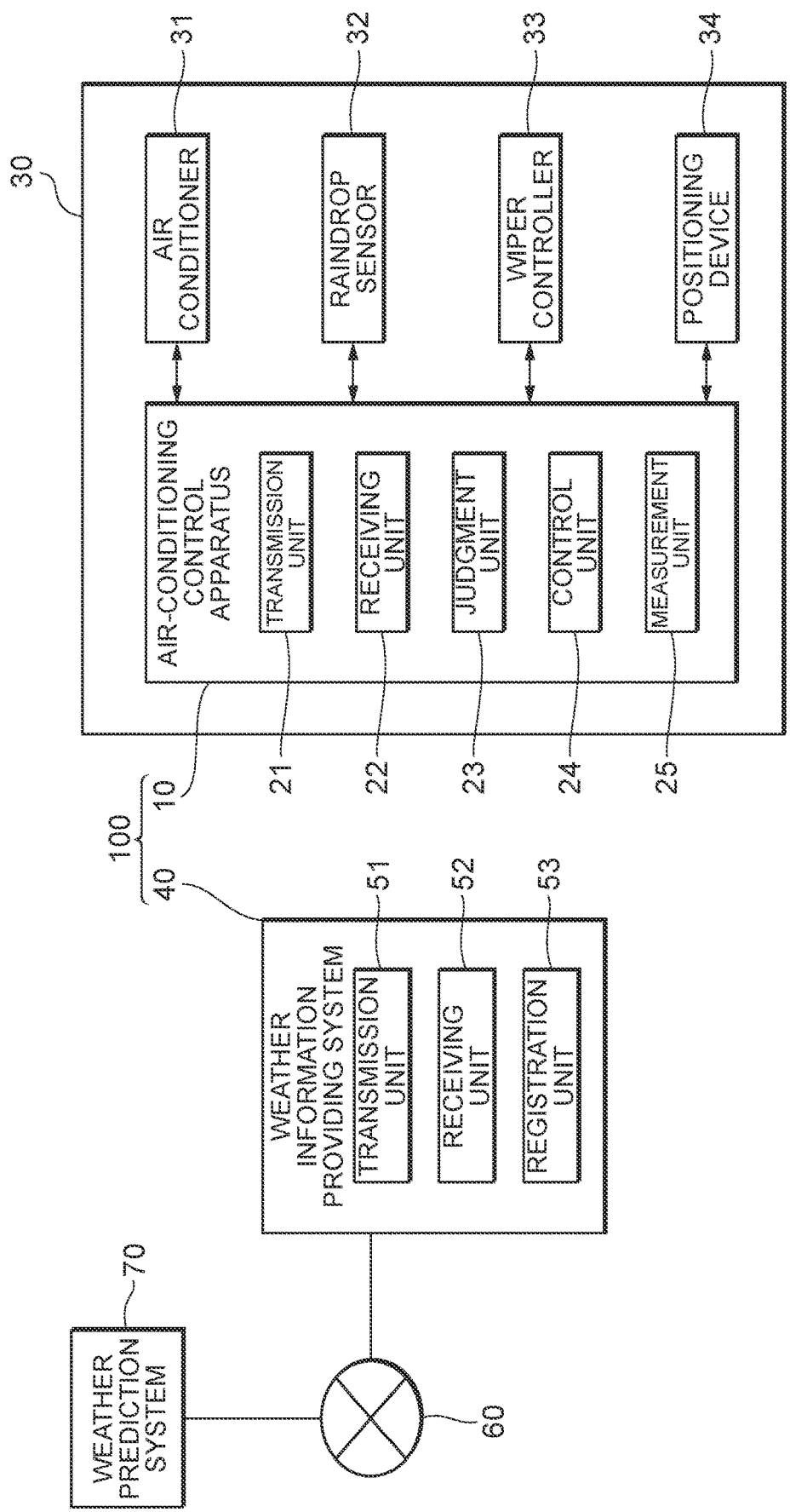
FIG. 2 is an illustration showing functions of the air-conditioning control system according to an embodiment of the invention.

Referring to FIG. 2, the functions of the air-conditioning apparatus 10 and the weather information providing system 40 will now be described below. When the air-conditioning control program 16 is interpreted and executed by the processor 12 so as to cause the hardware resources of the air-conditioning control apparatus 10 and the air-conditioning control program 16 to cooperate with each other, the functions of a transmission unit 21, a receiving unit 22, a judgment unit 23 and a control unit 24 are fulfilled. The function of the measurement unit 25 is fulfilled by the temperature sensor 14 and the atmospheric pressure sensor 15. When the control program 44 is interpreted and executed by the processor 42 so as to cause the hardware resources of the weather information providing system 40 and the control program 44 to cooperate with each other, the functions of a transmission unit 51, a receiving unit 52 and a registration unit 53 are fulfilled.

The transmission unit 21 of the air-conditioning control apparatus 10 transmits to the weather information providing system 40 a transfer request signal requesting the weather information providing system 40 to transfer weather information indicating an estimated weather condition (e.g., information indicating temperature, atmospheric pressure and humidity) at the position of the vehicle 30. The transfer request signal includes positional information indicating the current position of the vehicle 30. When the receiving unit 52 of the weather information providing system 40 receives the transfer request signal, the transmission unit 51 transmits an acquisition request signal requesting the weather prediction system 70 to provide the weather information indicating the estimated weather condition at the position of the vehicle 30. In response to such acquisition request signal, the weather prediction system 70 transmits the requested weather information to the weather information providing system 40. When the receiving unit 52 receives the weather information from the weather prediction system 70, the transmission unit 51 transmits the weather information to the vehicle 30. The receiving unit 22 of the air-conditioning control apparatus 10 receives, from the weather information providing system 40, the weather information indicating the estimated weather condition (e.g., information indicating temperature, atmospheric pressure and humidity) at the position of the vehicle 30.

The measurement unit 25 of the air-conditioning control apparatus 10 performs measurements concerning weather information indicating the actual weather condition (e.g., information indicating temperature, atmospheric pressure and humidity) at the position of the vehicle 30. In this specification, the weather information indicating the estimated weather condition at the position of the vehicle will be referred to as "first weather information" and the weather information indicating the actual weather condition at the position of the vehicle 30 will be referred to as "second weather information" to differentiate them from each other for the sake of explanation. The judgment unit 23 compares the first weather information and the second weather information to judge whether or not the reliability level of the first information is below a threshold value Th1. The magnitude of the threshold value Th1 represents the minimum reliability level required for the control of the air conditioner 31 based on the first weather information to work at an acceptable level for practical use.

Figure 3:
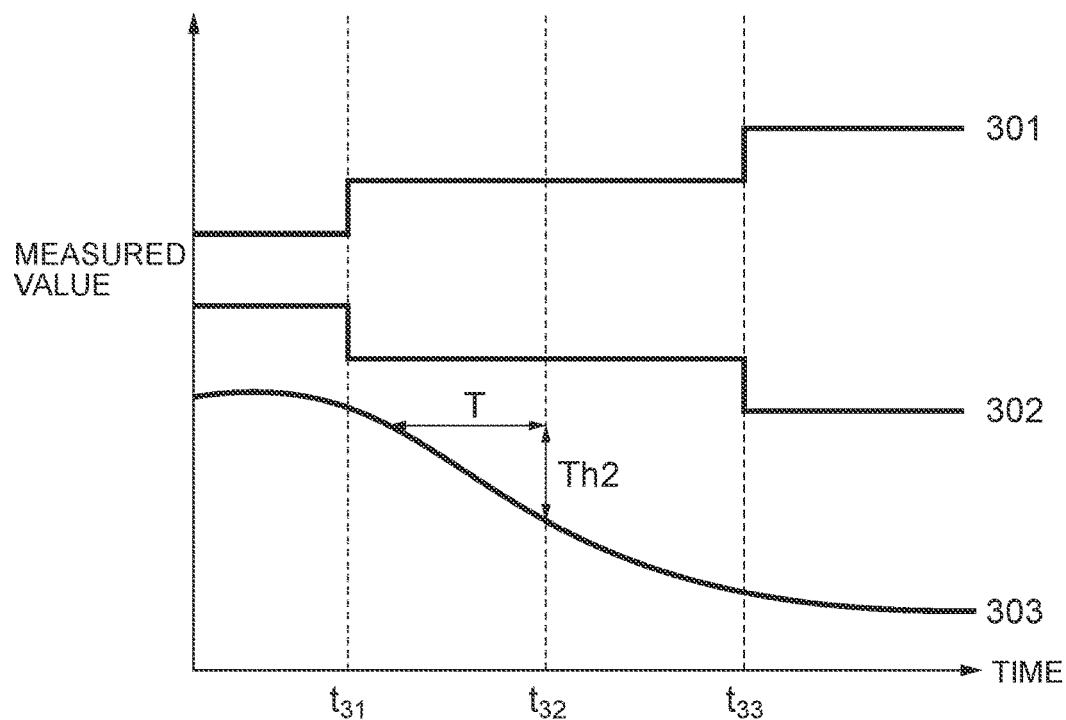
FIG. 3 is a graph showing an example of changes over time of weather information according to an embodiment of the invention.

The judgment unit 23 may judge whether or not the reliability level of the first weather information is below the threshold value Th1 by detecting a change per unit time of the second weather information. For example, in FIG. 3, reference numeral 301 denotes a change over time of humidity information included in the first weather information. Reference numeral 302 denotes a change over time of temperature information or atmospheric pressure information included in the first weather information. Reference numeral 303 denotes a change over time of temperature information or atmospheric pressure information included in the second weather information. Each of times t31 and t33 denote update timing of the first weather information. In the example shown in FIG. 3, a degree of change per unit time T of the temperature information or the atmospheric pressure information included in the second weather information exceeds a threshold value Th2 at time t32. When detecting that the degree of change per unit time T of the temperature information or the atmospheric pressure information included in the second temperature information exceeds the threshold value Th2, the judgment unit 23 judges that the reliability level of the first weather information is below the threshold value Th1. This takes into consideration a situation where, for example, when the vehicle 30 travels at a high speed or the weather changes suddenly, the second weather information would drastically change in a short period of time and the first weather information would not be able to follow the second weather information.

Figure 4:
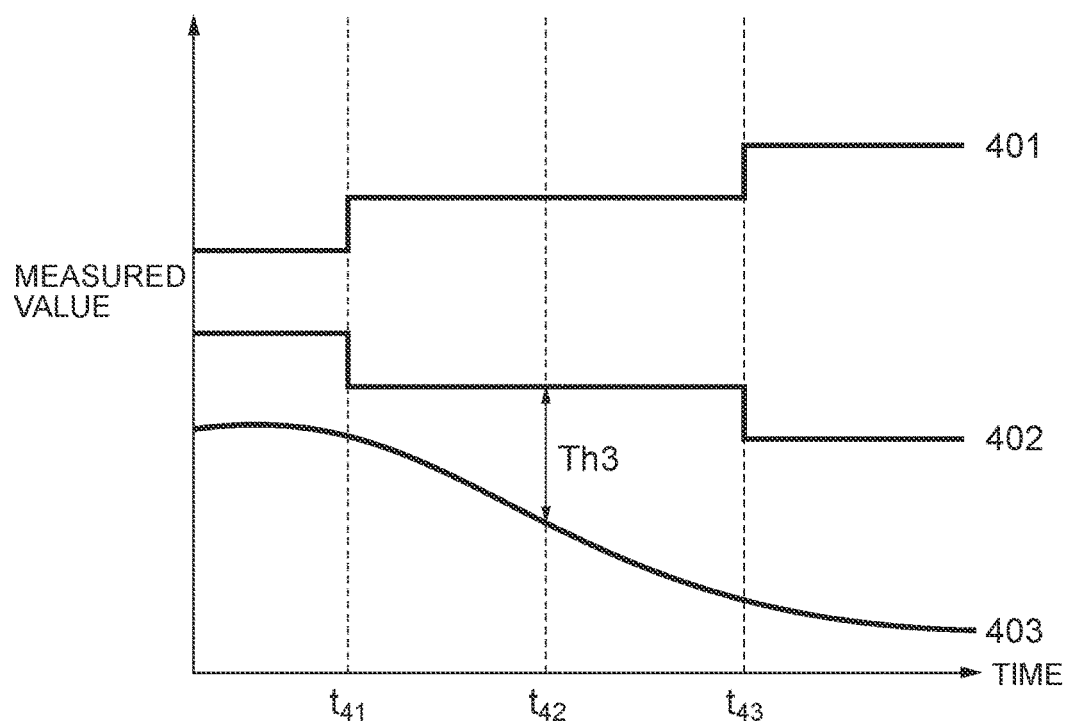
FIG. 4 is a graph showing an example of changes over time of weather information according to an embodiment of the invention.

The judgment unit 23 may judge whether or not the reliability level of the first weather information is below the threshold Th1 by, for example, comparing the first weather information and the second weather information. For example, in FIG. 4, reference numeral 401 denotes a change over time of humidity information included in the first weather information. Reference numeral 402 denotes a change over time of temperature information or atmospheric pressure information included in the first weather information. Reference numeral 403 denotes a change over time of temperature information or atmospheric pressure information included in the second weather information. Each of times t41 and t43 denote update timing of the first weather information. In the example shown in FIG. 4, a difference between the temperature information included in the first weather information and the temperature information included in the second weather information or a difference between the atmospheric pressure information included in the first weather information and the atmospheric pressure information included in the second weather information exceeds a threshold value Th3 at time t42. When detecting that the difference between the temperature information included in the first weather information and the temperature information included in the second weather information or the difference between the atmospheric pressure information included in the first weather information and the atmospheric pressure information included in the second weather information exceeds the threshold value Th3, the judgment unit 23 judges that the reliability level of the first weather information is below the threshold value Th1. The reason for this is that a large difference between the first weather information and the second weather information can be considered to result from a low reliability level of the first weather information.

The judgment unit 23 may estimate that the actual weather condition at the current position of the vehicle 30 is rainy based on one or both of the raindrop detection signal from the raindrop sensor 32 and the signal indicating that the wiper is in operation. When the actual weather condition at the current position of the vehicle 30 is rainy, the actual humidity at the current position of the vehicle 30 can be considered to be equal to or higher than a predetermined value (e.g., 90%). The judgment unit 23 may estimate the actual weather condition at the position of the vehicle 30 based on the raindrop detection signal from the raindrop sensor or the operation state of the wiper and judge whether or not the reliability level of the first weather information is below the threshold Th1 in consideration of such actual weather condition. For example, if the weather condition at the position of the vehicle 30 is estimated to be rainy based on the raindrop detection signal from the raindrop sensor 32 or the operation state of the wiper even though the humidity information included in the first weather information indicates a humidity of 20%, the judgment unit 23 may judge that the reliability level of the first weather information is below the threshold value Th1.

When the reliability level of the first weather information is equal to or higher than the threshold value Th1, the control unit 24 estimates the humidity inside the vehicle 30 based on the humidity information included in the first weather information and controls the air conditioner 31 based on the estimated humidity. For example, the control unit 24 may estimate that the humidity indicated by the humidity information included in the first weather information is similar to the humidity inside the vehicle 30 and control the air conditioner 31 based on the estimated humidity. For example, when the actual humidity at the current position of the vehicle 30 is low, the control unit 24 may control the air conditioner 31 so as to circulate the inside air. Such control is energy efficient since it is not necessary to release the heat inside the vehicle to the outside.

When the reliability level of the first weather information is below the threshold value Th1, the control unit 24 suspends the control of the air conditioner 31 based on the first weather information until the reliability level of the first weather information becomes equal to or higher than the threshold value Th1. For example, the control unit 24 may control the air conditioner 31 to introduce the outside air so as to prevent the windows of the vehicle 30 from being fogged until the reliability level of the first weather information becomes equal to or higher than the threshold value Th1.

The transmission unit 21 transmits, to the weather information providing system 40, the positional information of the vehicle 30 as of the time when a measurement concerning the second weather information is performed during the situation where the reliability level of the first weather information is below the threshold value Th1. In this specification, the position of the vehicle 30 as of the time when the measurement concerning the second weather information is performed during the situation where the reliability level of the first weather information is below the threshold value Th1 will be referred to as a "low-reliability position" and information indicating the low-reliability position will be referred to as "low-reliability position information," for the sake of explanation. When the receiving unit 52 of the weather information providing system 40 receives low-reliability position information from the vehicle 30, the registration unit 53 registers the low-reliability position information. The transmission unit 51 of the weather information providing system 40 may transmit information related to air-conditioning control to vehicles which can be expected to pass the registered low-reliability position or nearby areas. The information related to air-conditioning control may be, for example, information reporting that the reliability of the first weather information at the low-reliability position is below the threshold value Th1 or may alternatively be information recommending that the control of the air conditioner 31 based on the first weather information be suspended at the low-reliability position. The vehicles which have received the information related to air-conditioning control from the weather information providing system 40 can judge that the reliability of the first weather information provided by the weather information providing system 40 is low at the low-reliability position and suspend the control of the air conditioner 31 based on the first weather information until, for example, the reliability level of the first weather information becomes equal to or higher than the threshold value Th1.

Since the first weather information is updated at constant time intervals, an effective term during which the reliability level of the first weather information at the low-reliability position registered in the registration unit 53 can reasonably be estimated to be below the threshold value Th1 may be set to extend to the next update timing. The information related to the air-conditioning control which is transmitted to the vehicles expected to pass the low-reliability position from the transmission unit 51 of the weather information providing system 40 may include the effective term during which the reliability level of the first weather information at the low-reliability position can reasonably be estimated to be below the threshold value Th1.

Figure 5:
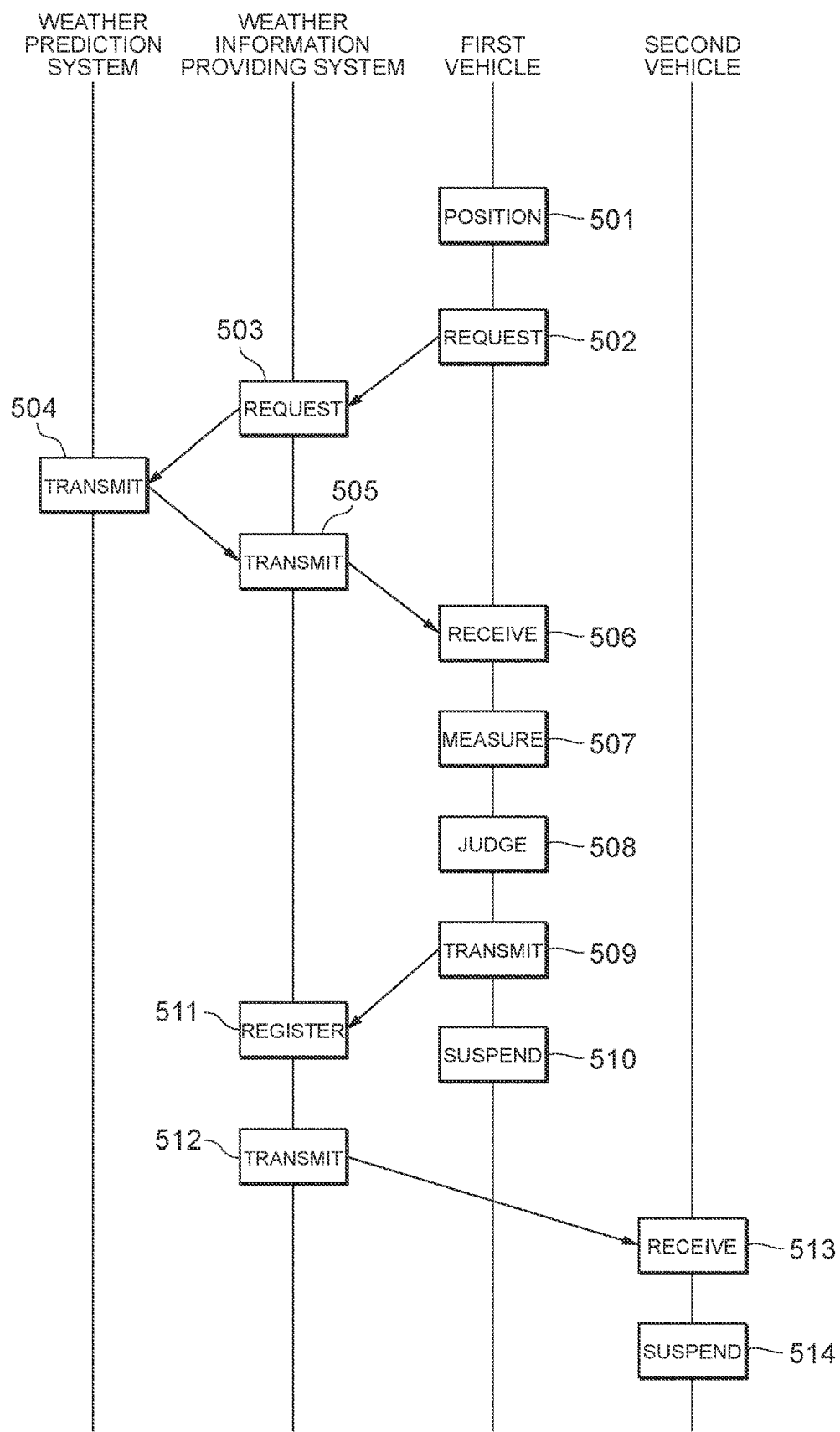
FIG. 5 is an illustration showing an example of a control method for an air-conditioning control apparatus according to an embodiment of the invention.

Next, referring to FIG. 5, an example of a control method of the air-conditioning control apparatus 10 according to an embodiment of the invention will be described below. For the sake of explanation, one of two vehicles 30 will be referred to as a first vehicle 30 and the other will be referred to as a second vehicle 30 to distinguish them from each other. Since detailed descriptions of steps 501 to 504 will be redundant due to some overlaps with the descriptions above, only simple descriptions will be provided below.

In step 501, the first vehicle 30 determines the current position thereof.

In step 502, the first vehicle 30 requests the weather information providing system 40 to transfer first weather information indicating the estimated weather condition (e.g., information indicating temperature, atmospheric pressure and humidity) at the current position.

In step 503, the weather information providing system 40 requests the first weather information from the weather prediction system 70 in response to the request from the first vehicle 30.

In step 504, the weather prediction system 70 transmits the first weather information to the weather information providing system 40 in response to the request from the weather information providing system 40.

In step 505, the weather information providing system 40 transmits the first weather information to the first vehicle 30.

In step 506, the first vehicle 30 receives the first weather information from the weather information providing system 40.

In step 507, the first vehicle 30 performs measurements concerning the second weather information indicating the actual weather condition (e.g., information indicating temperature, atmospheric pressure and humidity) at the current position of the vehicle 30.

In step 508, the first vehicle 30 judges whether or not the reliability level of the first weather information is below the threshold value Th1 by comparing the first weather information and the second weather information or by detecting a change per unit time of the second weather information.

When the reliability level of the first weather information is below the threshold value Th1, in step 509, the first vehicle 30 transmits low-reliability position information to the weather information providing system 40.

In step 510, the first vehicle 30 suspends control of the air conditioner 31 based on the first weather information until the reliability level of the first weather information becomes equal to or higher than the threshold value Th1.

In step 511, the weather information providing system 40 registers the low-reliability position information of the first vehicle 30.

In step 512, the weather information providing system 40 transmits information related to air-conditioning control to the second vehicle 30 which is expected to pass the low-reliability position or its nearby areas. The information related to air-conditioning control may be, for example, information reporting that the reliability of the first weather information at the low-reliability position is below the threshold value Th1 or may alternatively be information recommending that control of the air conditioner 31 based on the first weather information be suspended at the low-reliability position. Further, the information related to air-conditioning control may include an effective term during which the reliability level of the first weather information at the low-reliability position can reasonably be estimated to be below the threshold value Th1.

In step 513, the second vehicle 30 receives the information related to the air-conditioning control from the weather information providing system 40.

In step 514, the second vehicle 30 judges that the reliability level of the first weather information provided by the weather information providing system 40 is low at the low-reliability position and suspends the control of the air conditioner 31 based on the first weather information until the reliability level of the first weather information becomes equal to or higher than the threshold value Th1.

According to the present embodiment, since the low-reliability position information detected by a certain vehicle 30 can be used for air-conditioning control of another vehicle 30 via the weather information providing system 40, it is possible to appropriately control air-conditioners 31 of the vehicles 30.

Each of the above embodiments is intended to aid in easier understanding of the invention and is not intended to limit the interpretation of the invention. Changes or modifications may be made to the invention without departing from the gist thereof and equivalents of and to the invention are also encompassed in the scope of the invention. For example, similar functions to those of the transmission unit 21, the receiving unit 22, the judgment unit 23 and the control unit 24 may be fulfilled using hardware resources or firmware dedicated to the air-conditioning control apparatus 10. Similarly, similar functions to those of the transmission unit 51, the receiving unit 52 and the registration unit 53 may be fulfilled using hardware resources or firmware dedicated to the weather information providing system 40. The dedicated hardware resources may be, for example, an application specific integrated circuit (ASIC) or a field programmable gate array (FPGA). The functions of the weather information providing system 40 may not necessarily be fulfilled by one computer system and may rather be fulfilled by a plurality of computer systems connected to the communication network 60.

The air-conditioning control system according to the invention is capable of appropriately controlling an air conditioner in a vehicle.

What is claimed is:

1. An air-conditioning control system comprising:
    a weather information providing system that provides weather information; and
    an air-conditioning control apparatus that controls an air conditioner installed in a vehicle, wherein the air-conditioning control apparatus includes:
        a receiving unit that receives, from the weather information providing system, first weather information indicating an estimated weather condition at a position of the vehicle;
        a measurement unit that performs measurements concerning second weather information indicating an actual weather condition at the position of the vehicle;
        a judgment unit that judges whether or not a reliability level of the first weather information is below a first threshold value by comparing the first weather information and the second weather information or by detecting a change per unit time of the second weather information; and
        a transmission unit that transmits, to the weather information providing system, positional information of the vehicle as of a time when a measurement concerning the second weather information is performed during a situation where the reliability level of the first weather information is below the first threshold value.

2. The air-conditioning control system according to claim 1, wherein the weather information providing system includes a registration unit that registers the positional information of the vehicle as of the time when the measurement concerning the second weather information is performed during the situation where the reliability level of the first weather information is below the first threshold value.

3. The air-conditioning control system according to claim 1, wherein:
    the second weather information includes information on an actual atmospheric pressure or an actual temperature at the position of the vehicle; and
    the judgment unit judges that the reliability level of the first weather information is below the first threshold value when a degree of change per unit time of the actual atmospheric pressure or the actual temperature exceeds a second threshold value.

4. The air-conditioning control system according to claim 1, wherein the judgment unit estimates a weather condition at the position of the vehicle based on a raindrop detection signal from a raindrop sensor in the vehicle or an operation state of a wiper of the vehicle and judges whether or not the reliability level of the first weather information is below the first threshold value by taking the estimated weather condition into consideration.

5. The air-conditioning control system according to claim 1, wherein the air-conditioning control apparatus includes a control unit that controls the air conditioner based on the first weather information when the reliability level of the first weather information is equal to or higher than the first threshold value, and suspends control of the air conditioner based on the first weather information until the reliability level of the first weather information becomes equal to or higher than the first threshold value when the reliability level of the first weather information is below the first threshold value.

6. The air-conditioning control system according to claim 5, wherein:
    the first weather information includes humidity information; and
    when the reliability level of the first weather information is equal to or higher than the first threshold value, the control unit estimates a humidity inside the vehicle based on the humidity information included in the first weather information and controls the air conditioner based on the estimated humidity.

7. A control method for an air-conditioning apparatus that controls an air conditioner installed in a vehicle, the method comprising:
    receiving, by the air-conditioning control apparatus, first weather information indicating an estimated weather condition at a position of the vehicle from a weather information providing system;
    performing, by the air-conditioning control apparatus, a measurement concerning second weather information indicating an actual weather condition at the position of the vehicle;
    judging, by the air-conditioning control apparatus, whether or not a reliability level of the first information is below a first threshold value by comparing the first weather information and the second weather information or by detecting a change per unit time of the second weather information; and
    transmitting to the weather information providing system, by the air-conditioning control apparatus, positional information of the vehicle as of a time when the measurement concerning the second weather information is performed during a situation where the reliability level of the first weather information is below the first threshold value.

* * * * *